(12) United States Patent
Likar

(10) Patent No.: US 10,432,463 B2
(45) Date of Patent: Oct. 1, 2019

(54) FAST BSS TRANSITIONS BETWEEN ACCESS POINTS FOR STATIONS OF CLOUD-CONTROLLED WI-FI NETWORKS

(71) Applicant: CloudMondo, Inc., Santa Clara, CA (US)

(72) Inventor: Bojan Likar, Cupertino, CA (US)

(73) Assignee: Neutrino8, Inc., Santa Clara, CA (US)

( * ) Notice: Subject to any disclaimer, the term of this patent is extended or adjusted under 35 U.S.C. 154(b) by 59 days.

(21) Appl. No.: 15/715,163

(22) Filed: Sep. 26, 2017

(65) Prior Publication Data

US 2018/0183662 A1 Jun. 28, 2018

Related U.S. Application Data

(63) Continuation-in-part of application No. 15/390,426, filed on Dec. 23, 2016.

(51) Int. Cl.
| | |
|---|---|
| H04L 12/24 | (2006.01) |
| H04W 48/20 | (2009.01) |
| H04W 36/00 | (2009.01) |
| H04W 84/12 | (2009.01) |

(52) U.S. Cl.
CPC ........ *H04L 41/083* (2013.01); *H04L 41/0809* (2013.01); *H04L 41/0873* (2013.01); *H04L 41/0883* (2013.01); *H04L 41/0889* (2013.01); *H04W 48/20* (2013.01); *H04W 36/0061* (2013.01); *H04W 84/12* (2013.01)

(58) Field of Classification Search
CPC ....................................... H04L 41/083
USPC ........................................... 370/331
See application file for complete search history.

(56) References Cited

U.S. PATENT DOCUMENTS

| | | | |
|---|---|---|---|
| 2006/0256763 A1 | 11/2006 | Nguyen | |
| 2010/0241854 A1* | 9/2010 | Yao | ........ H04L 63/061 713/168 |
| 2016/0212695 A1 | 7/2016 | Lynch | |

* cited by examiner

*Primary Examiner* — Shripal K Khajuria
(74) *Attorney, Agent, or Firm* — Law Office of Dorian Cartwright; Dorian Cartwright

(57) ABSTRACT

A cloud-based Wi-Fi controller facilitates fast BSS transitions. IEEE 802.11r or other fast BSS transition parameters are transferred through the cloud from the wireless station, for pre-population in neighboring or nearby access points. In more detail, a neighbor list is received from a wireless station connected to the data communication system through a first access point. The neighbor list identifying access points within range of the wireless station or that are otherwise nearby, from the cloud for pre-configuration.

6 Claims, 11 Drawing Sheets

FAST BSS TRANSITIONS BETWEEN ACCESS POINTS FOR STATIONS OF CLOUD-CONTROLLED WI-FI NETWORKS

CROSS-REFERENCE TO RELATED APPLICATIONS

This application claims the benefit of priority as a continuation-in part under 35 U.S.C. 120 to U.S. application Ser. No. 15/390,426, filed Dec. 23, 2016, and commonly owned, the contents of which being hereby incorporated by reference in its entirety.

FIELD OF THE INVENTION

The invention relates generally to a computerized networking system, and more specifically, to fast BSS (basic service set) transitions between access points for stations of cloud-controlled Wi-Fi networks.

BACKGROUND

Consumer demand for ubiquitous Internet availability for mobile computing devices continues to be strong. However, access points, ISPs (Internet service providers), and other network components do not operate in a coordinated manner with competitors. Therefore, when a mobile device is handed-off between access points, reauthentication with RADIUS services is required, in some cases.

What is needed is a robust technique for fast BSS transitions between access points for stations of cloud-controlled Wi-Fi networks.

SUMMARY

The above-mentioned needs are met with methods, computer products, and devices for a computer-implemented method for secure plug-and-play configuration for fast BSS transitions between access points for stations of cloud-controlled Wi-Fi networks.

In one embodiment, a neighbor list is received from a network device connected to the data communication system through a first access point. The neighbor list identifying access points within range of the network device or that are otherwise nearby. IEEE 802.11r or other fast BSS transition parameters from the network device.

In another embodiment, the IEEE 802.11r parameters are wirelessly transmitted to a second access point from the neighbor list, prior to handing-off the wireless station. Eventually, the wireless station is selected to be handed-off from the first access point to the second access point, or the wireless station initiates its own hand-off. In response, commands are sent to the first access point and to the second access point to execute a fast hand-off to re-associate the network device with the second access point for connection to the data communication system, as a fast BSS transition.

Advantageously, wireless station, and thus, network quality of service is improved.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, (non-transitory) computer program products, and systems for plug-and-play configuration for fast BSS transitions between access points for stations of cloud-controlled Wi-Fi networks, as described herein. As used herein, xxx refers to registering network devices for cloud configuration. One of ordinary skill in the art will recognize variations to the disclosed embodiments that are contemplated, although not explicitly described.

I. Systems for Fast BSS Transitions (FIGS. 1-5)

Figure 1A:
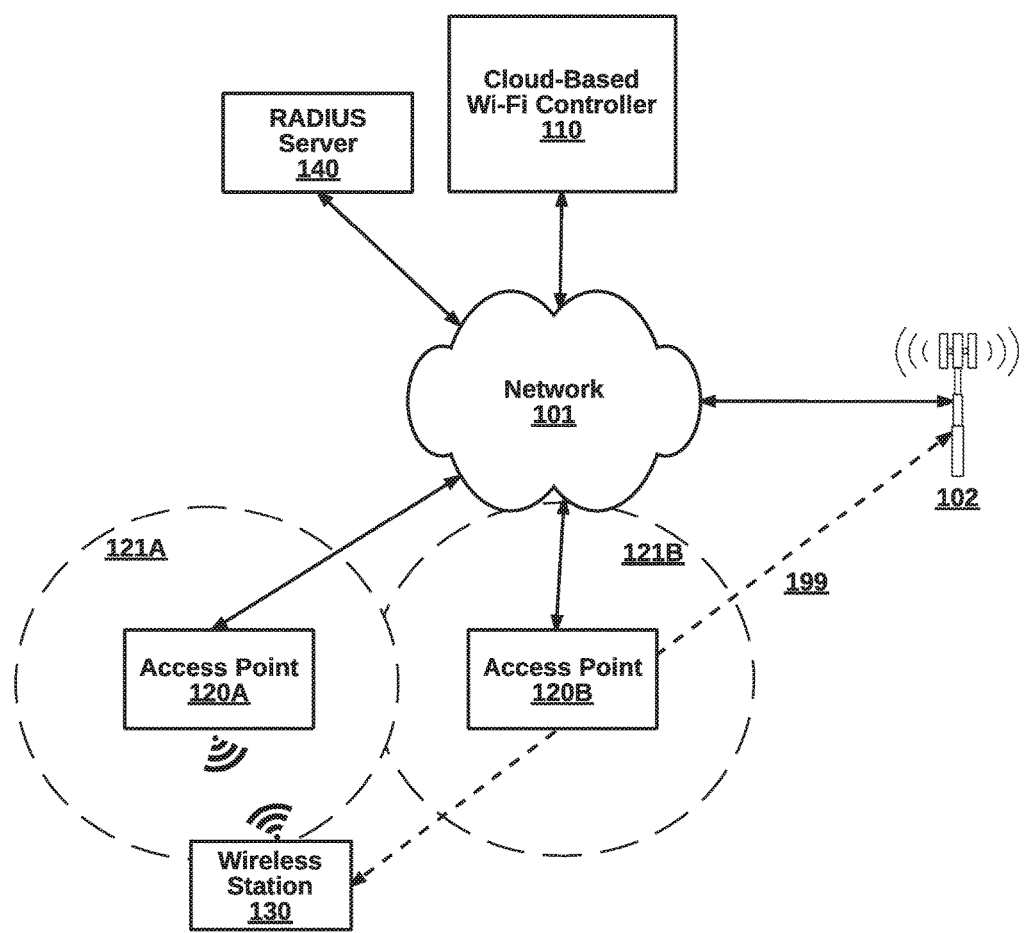
FIGS. 1A and 1B are high-level block diagrams illustrating a system for fast BSS transitions between access points for stations of cloud-controlled Wi-Fi networks, according to an embodiment.
Figure 1B:
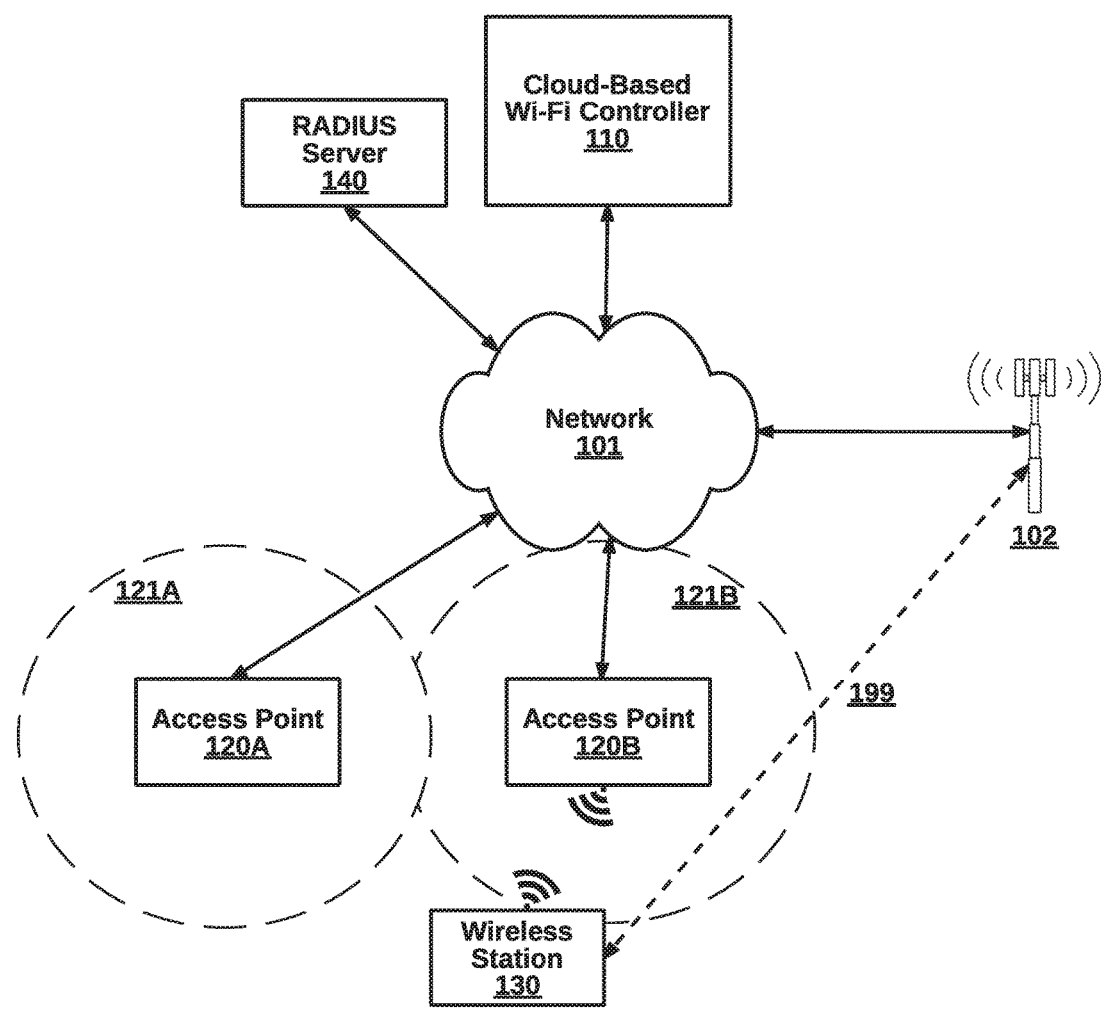

FIG. 1A is a high-level block diagram illustrating a system 100 for plug-and-play configuration for fast BSS transitions between access points for stations of cloud-controlled Wi-Fi networks, according to an embodiment. FIG. 1B shows the system 100 after a hand-off according to the techniques described herein. A cellular-to-data network unit 102 provides a continual connection to the cloud-based Wi-Fi controller 110, and is central to overcoming the mixed user domain problem.

The system 100 comprises a cloud-based Wi-Fi controller 110, access points 120A,B, a wireless station 130, and RADIUS server 140. In other embodiments of the system 100, additional network components can also be part of the systems, such as firewalls, virus scanners, routers, switches, application servers, databases, as well as additional controllers, access points, access switches, stations, and the like. The network components as set forth throughout the different embodiments described herein can be implemented as hardware, software, or a combination of both. The system 100 can be implemented in home networking systems with easy consumer set-up. Also, system 100 can be implemented in enterprise networking systems for quick deployment without the need for a network administrator.

The components of the system 100 can communicate by transmitting data through a network 101. More specifically, the network 101 couples the cloud-based Wi-Fi controller 110 to the network device 120, preferably over a wired connection. The network 101 can be the Internet, a wide area network, a local area network, an enterprise network, or the like. The network 101 can be a data network or a cellular network (e.g., 3G or 4G), or a combination of different types of networks. A cellular-to-data network unit 102 can couple the wireless station 130 to the cloud-based Wi-Fi controller 110 via the network 101. The wireless station 130 connects over Wi-Fi to the access points 120A or 120B.

The cloud-based Wi-Fi controller 110 pre-populates selected access points with fast BSS transition parameters for the wireless station 130 and other wireless stations. More specifically, the cloud-based Wi-Fi controller 110 connects to access points and also to wireless stations. Neighbor lists compiled by the wireless stations are periodically sent from wireless stations to the cloud-based Wi-Fi controller 110. This allows the cloud-based Wi-Fi controller 110 to send fast BSS parameters (e.g., IEEE 802.11r parameters) to neighbors of the wireless station.

When a hand-off condition is detected responsive to a change in location of a wireless station, a hand-off can be a fast BSS transition to a new access point, as controlled from the cloud. One example hand-off condition is a change in location for a wireless station (e.g., while a user is walking or riding in an automobile). The hand-off speed reduces frame loss in VOIP calls to maintain QoS of video quality while mobile.

In an embodiment, the cloud-based Wi-Fi control 110 matches identification information received from the wireless station 130 over an authenticated communication channel to identification information received from the access points 120A,B, in order to identify access points to which the wireless station 130 (or current user of the wireless station 130) has permission to connect. A neighbor list received from the wireless station 130 identifies access points within range of the wireless station 130. A cross-match of the neighbor list to those which the wireless station 130 has permission further identifies access points to which fast BSS transition parameters will be sent, in some embodiments, even before a hand-off is attempted.

Some embodiments of identified access points belong to different user domains. For example, the access point 120A and the access point B can be owned by two different companies, two different service providers (e.g., Verizon and AT&T), two different homes (e.g., two neighbors), or the like. Regardless of ownership, as long as the wireless station 130 has permission on a user profile of the cloud-based controller 110, fast BSS transition is enabled across the user domains.

The automation provided by various services simplifies human interaction during configuration. A network device merely needs to be plugged in and powered up, and scanned from a trusted device (e.g., a digital camera integrated to the wireless station 130). From that point, an automated process eases complexity and human labor. Enterprise networks can be configured without the need for a network administrator.

The cloud-based Wi-Fi controller 110 and other components of the system 100 can be any computerized device or processor driven device. Example embodiments include server blades, desktop computers, laptops, smart telephones, tablets, phablets and the like. In some cases, the cloud-based Wi-Fi controller 110 is operated by a service provider that services various user accounts for different users. In other cases, the cloud-based Wi-Fi controller 110 is owned by the same entity the owns associated access points. The cloud-based Wi-Fi controller 110 can be manufactured by the same entity that manufactures the access points 120A,B, or not. More detailed embodiments of the cloud-based Wi-Fi onboarding server 110 are set forth below with respect to FIG. 2.

The access points 120A,B receive fast BSS parameters for wireless stations in the area that are not yet connected. Once a wireless station makes contact, fast BSS parameters are retrieved (e.g., looked up according to a MAC address) and implemented (e.g., wireless station 130 switching from access point 120A to access point 120B from FIG. 1A to FIG. 1).

More generally, the access points 120A,B provide access to the network 101 for wireless stations (e.g., wireless station 130). The access points 120A,B can each be a traditional access point, or be a hybrid access point, router, switch, or the like. More detailed embodiments of the master base station 130 are described in below with respect to FIG. 3.

The wireless station 130 uses fast BSS transition parameters to seamlessly move between access points, of the same or of different user domains. An example of mixed user domains is when the access point 120A can be owned by a home owner and the access point 120B can be owned by a neighbor, and each has reciprocity on the other's Wi-Fi network. The fast BSS transition parameters that are typically submitted by the wireless station 130 to access points have already been pre-populated based on the corresponding neighbor list of access points. As a result, the RADIUS server 140 authentication protocol can be bypassed when roaming on the neighbor's Wi-Fi network. This Wi-Fi reciprocity can increase Wi-Fi range for cooperating neighbors.

In another embodiment, the wireless station 130 provides a user interface (e.g., a web browser or mobile app) for a user that wants to configure a user profile on the cloud-based Wi-Fi controller 110. For example, a dashboard for a user account can show authorized network and new access points of the same user or of different users can be associated with a user device through the user profile.

Figure 8:
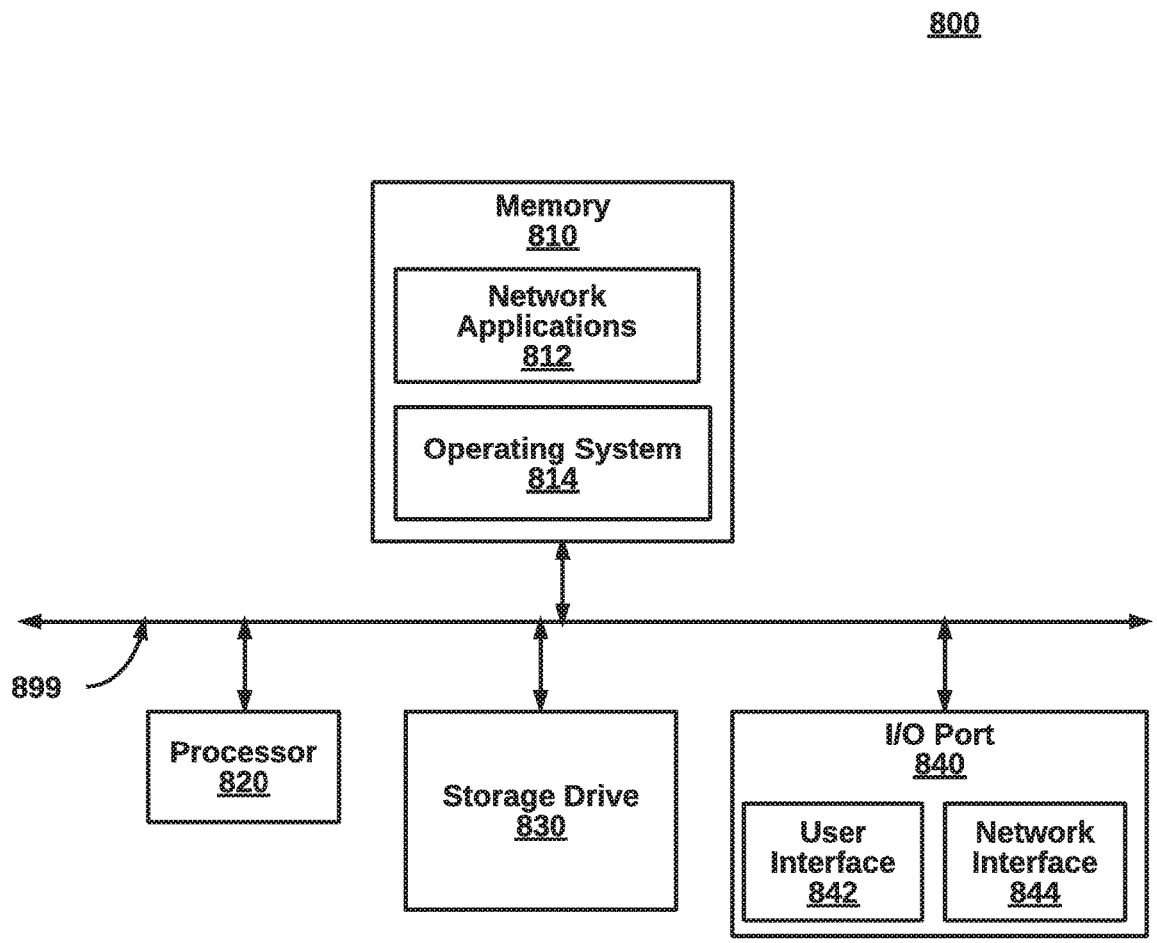
FIG. 8 is a block diagram illustrating an exemplary computing device for implementing the techniques described herein, according to one embodiment.

In some embodiments, the wireless station 130 can be a mobile telephone, a tablet, a phablet, a laptop, or be implemented by any of the computerized devices discussed herein, and generally in FIG. 8. For instance, a smart phone is typically equipped with Wi-Fi and cellular data network transceivers. A mobile app can be downloaded to coordinate between the heterogeneous communication channels and for communication with the cloud-based Wi-Fi onboarding server 110. Examples wireless station 130 is described in more detail below in association with FIG. 4.

The RADIUS server 140 authenticates wireless stations using Authentication, Authorization, and Accounting (AAA) management for users, in an embodiment. RADIUS is a client/server protocol that runs in the application layer, and can use either TCP or UDP as transport between a RADIUS client (e.g. a NAS (network access server) device) and a RADIUS server. For example, the RADIUS server 140 can pass an Accept or Reject message to a NAS client, once authentication is complete. The NAS client will then permit or reject connection of a wireless station to the network. One problem with the prior art, as discussed above, is that the RADIUS server 140 is part of each hand-off for wireless stations (e.g., between ISPs (Internet Service Providers)). One example of the RADIUS server 140 implements RFC2865 and RFC2866 RADIUS authentication and accounting protocols. However, in the system 100, the RADIUS server 140 can be bypassed for hand-offs using fast transition protocols such as IEEE 802.11r.

Figure 2:
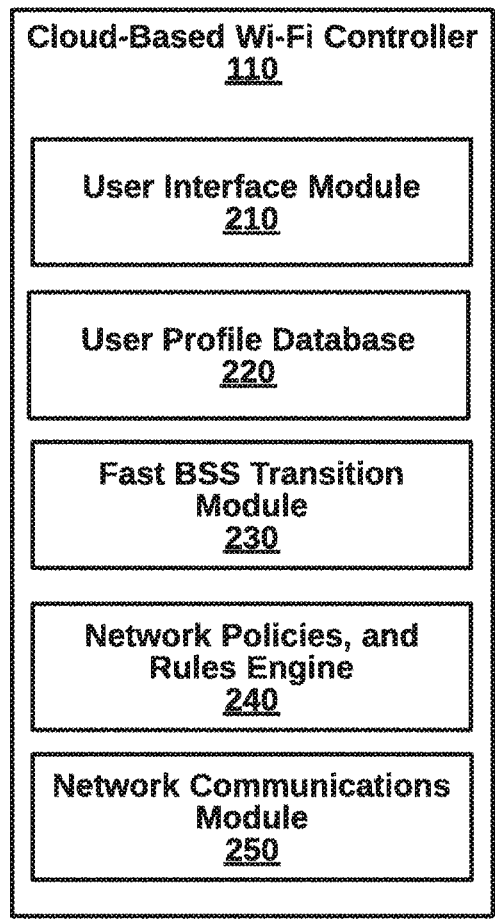
FIG. 2 is a more detailed block diagram illustrating a cloud-based Wi-Fi controller of the system of FIGS. 1A-B, according to one embodiment.

FIG. 2 is a more detailed block diagram illustrating a cloud-based Wi-Fi controller 110 of the system of FIGS. 1A-B, according to one embodiment. The cloud-based Wi-Fi controller 110 of this embodiment includes a user interface module 210, a user profile database 220, a fast BSS transition module 230, a network policies and rules engine 240, and a network communication module 250.

The user interface module 210 provides access for users through a network browser or client-side mobile app, for example, for authentication and other fast hand-off policies. In one embodiment, high level settings are provided for average home users. In another embodiment, granular settings are provided for network administrators to set configurations. Settings can be saved as rules that are applied against data for fast BSS transitions. The user profile database 220 can save specific settings on a per-user, per-institution, per-entity basis, for instance.

The fast BSS transition module 230 communicates with wireless devices and also with access points to pre-populate access points with fast BSS transition parameters for nearby or neighboring wireless devices. In one embodiment, an app running on a wireless device authenticates a user, in order to move BSS transition control to the cloud (e.g., cloud-based Wi-Fi controller). In one embodiment, the fast BSS transition module 230 determines when a hand-off is necessary rather than waiting for the wireless device to initiate the hand-off. In one case, the hand-off is triggered by conditions on the Wi-Fi network, while in another case, the hand-off is triggered by a low RSSI between a current access point and a wireless device. In still another case, the hand-off is triggered because a VOIP app is running.

The network policies and rules engine 240 implements specific rules for fast BSS transitions. In one example, specific rules are customized for each user through a user profile. The rules are applied to determine, for example, when current readings trigger a condition (e.g., RSSI threshold for fast BSS transition). The rules can also implement network policies, such as security policies that take an access point offline for interrogation, resulting in forced hand-offs of all connected wireless stations. The hand-offs can be fast BSS transition hand-offs, as described herein.

The networking communication module 250 can comprise networking interface components such as Wi-Fi radios, Wi-Fi antennae, transceivers, coders and decoders, digital signal processors, and other supporting lower level hardware and processes necessary for communication across channels. The networking hardware 250 can support different variations of IEEE 802.11, including multiple input/multiple output (MIMO) and other techniques. Returning to the task of sending generated parameters to slave base stations, data packets sent over the data network are received by an interface to a cellular data network (e.g., Verizon 4G cellular data network). A cellular data network including, for example, cell towers pass the data packets to wireless stations.

Figure 3:
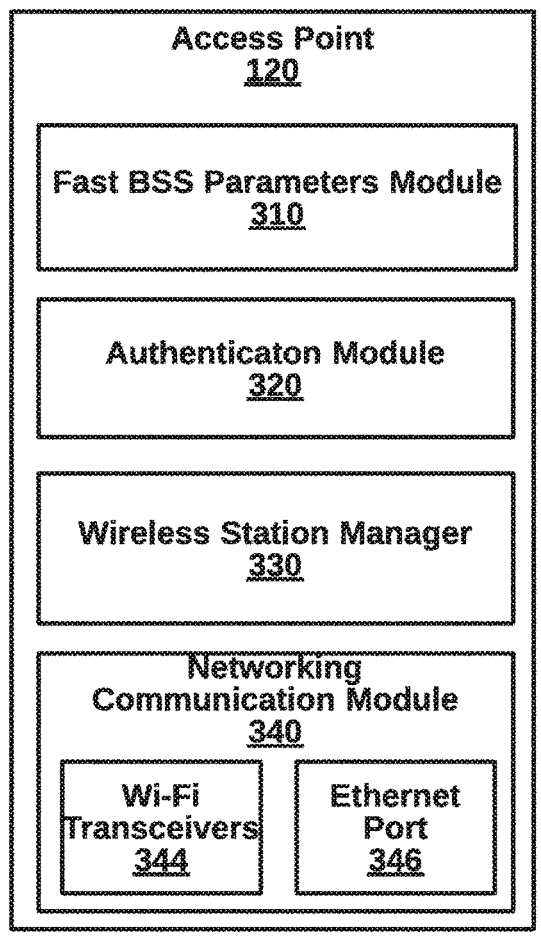
FIG. 3 is a more detailed block diagram illustrating an access point of the system in FIGS. 1A-B, according to one embodiment.

FIG. 3 is a more detailed block diagram illustrating a access point 120 (representative of either the access point 120A or the access point 130) of the system 100 of FIGS. 1A-B, according to one embodiment. The access point 120 includes an onboarding application 310, an authentication module 320, a wireless station manager 330, and a networking communication module 340.

In an embodiment, the fast BSS application 310 calls the cloud-based Wi-Fi controller 110 across the network 101 upon activation. IEEE 802.11r parameters or other fast BSS transition parameters can be stored in the fast BSS parameters module prior to a specific wireless station making contact. The parameter, in combination with identification information for a specific wireless device, allows connection without the standard exchanges called for under the IEEE 802.11r or other protocols. The fast BSS application 310 can be executed as part of an operating system, or alternatively, as an application (e.g., downloaded application) interacting with an operating system. The authentication module 320 executes security policies against wireless stations, such as checking credentials with the RADIUS server 140, for example, for wireless stations without preconfigured fast BSS parameters.

The wireless station manager 330 registers wireless stations directly connecting under the techniques described herein. In some cases, wireless stations can be handed off to other access points.

The networking communication module 340 comprises a Wi-Fi transceiver 344 and an Ethernet port 346. In one instance, IEEE 802.11 network packets are received from wireless stations and are transformed to Ethernet packets forwarded to the destinations on the network 101. The reverse data path is also handled by the networking communication module 340. Other embodiments with different transceivers are possible.

Figure 4:
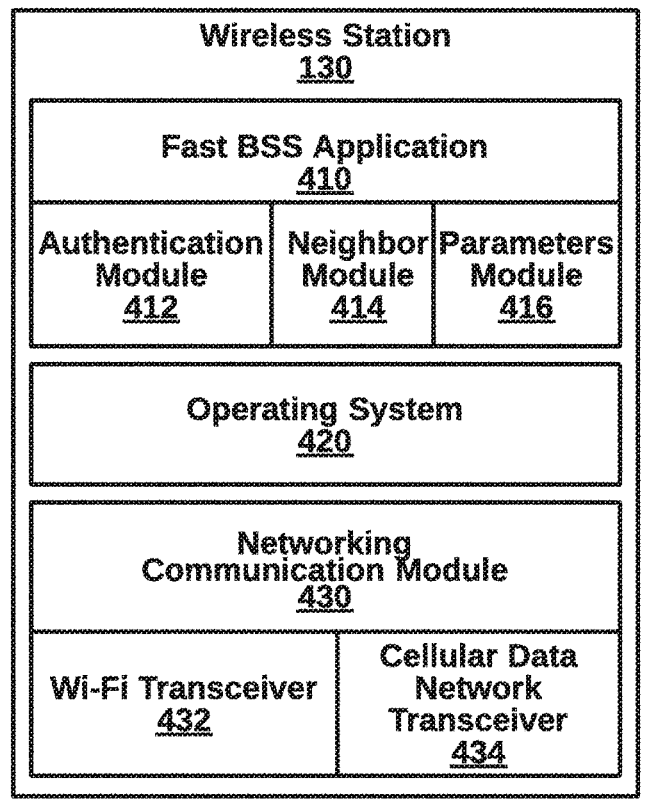
FIG. 4 is a more detailed block diagram illustrating a wireless station of the system of FIGS. 1A-B, according to an embodiment.

FIG. 4 is a more detailed block diagram illustrating the wireless station 130 of the system of FIGS. 1A-B, according to an embodiment. The wireless station 130 includes a fast BSS application 410, an operating system 420, and a networking communication module 430.

The fast BSS application 410 includes an authentication module 412 passes log-in credentials for a secure connection with the cloud-based Wi-Fi controller 110. The fast BSS application 410 can also include a neighbor module 414 ping to discover neighboring access points, and pass a compiled list to the cloud-based Wi-Fi controller 110. Moreover, the fast BSS application 410 includes a parameters module 416 to identify and pass parameters to the cloud-based Wi-Fi controller 110. The fast BSS application 410 can be executed as integral to the operating system 420, or alternatively, as an application interacting with an operating system. A user interface component allows a user to log in to a server and make configuration changes.

The networking communication module 430 includes hardware and software implementing lower level networking functionalities. In particular, a Wi-Fi transceiver 432 couples to a Wi-Fi device (e.g., network device 120) for data communications. Optionally, SMS provides data communications. A cellular data network transceiver 434 couples to a cell tower (e.g., the cellular-to-data network unit 102) for data communications. Optionally, SMS provides data communications.

Figure 5A:
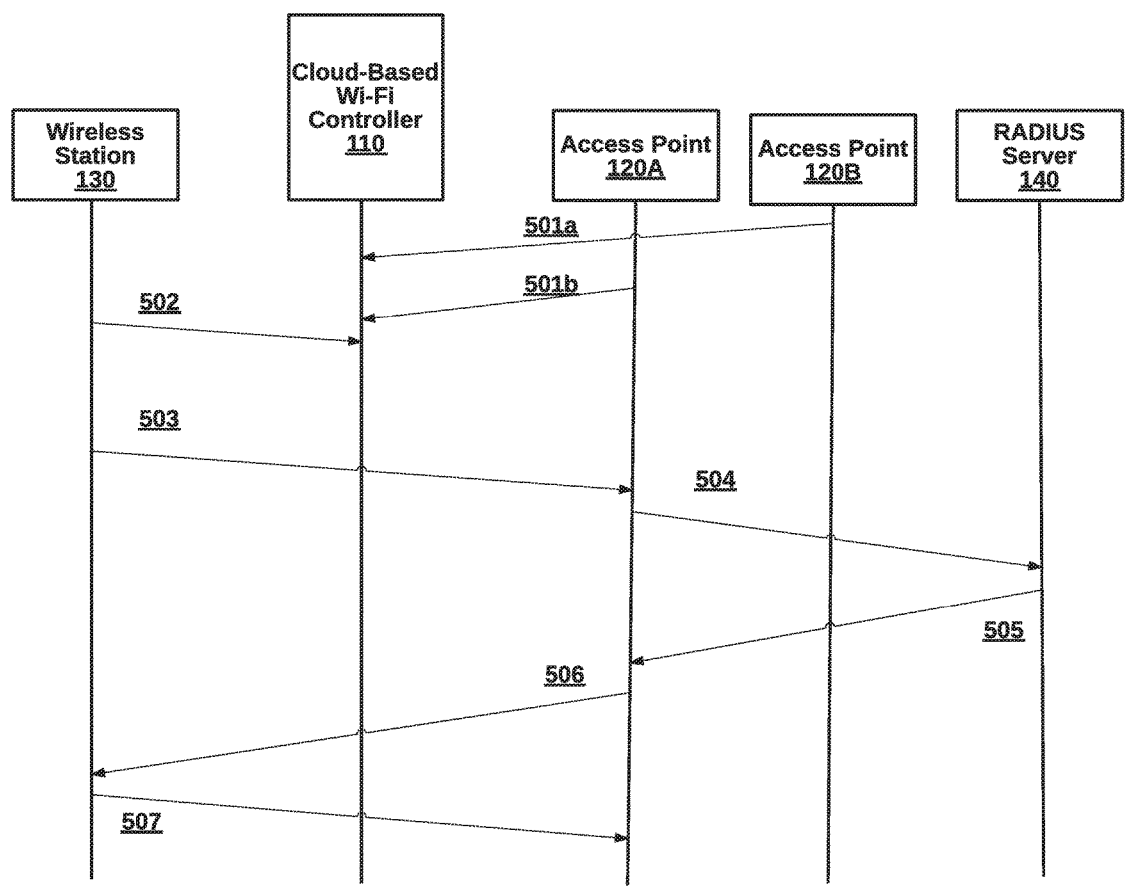
FIGS. 5A-5C are sequence diagrams illustrating interactions between components of the system in FIGS. 1A-B, according to one embodiment.
Figure 5B:
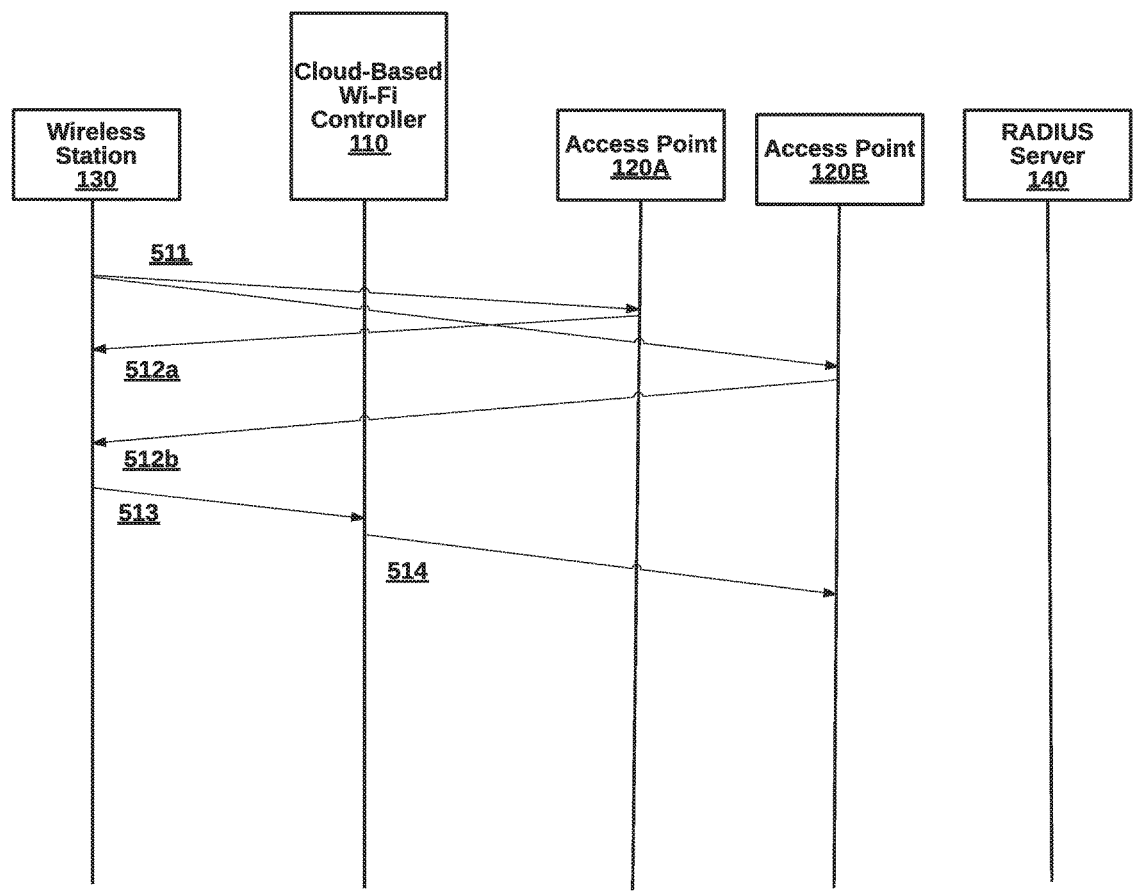
Figure 5C:
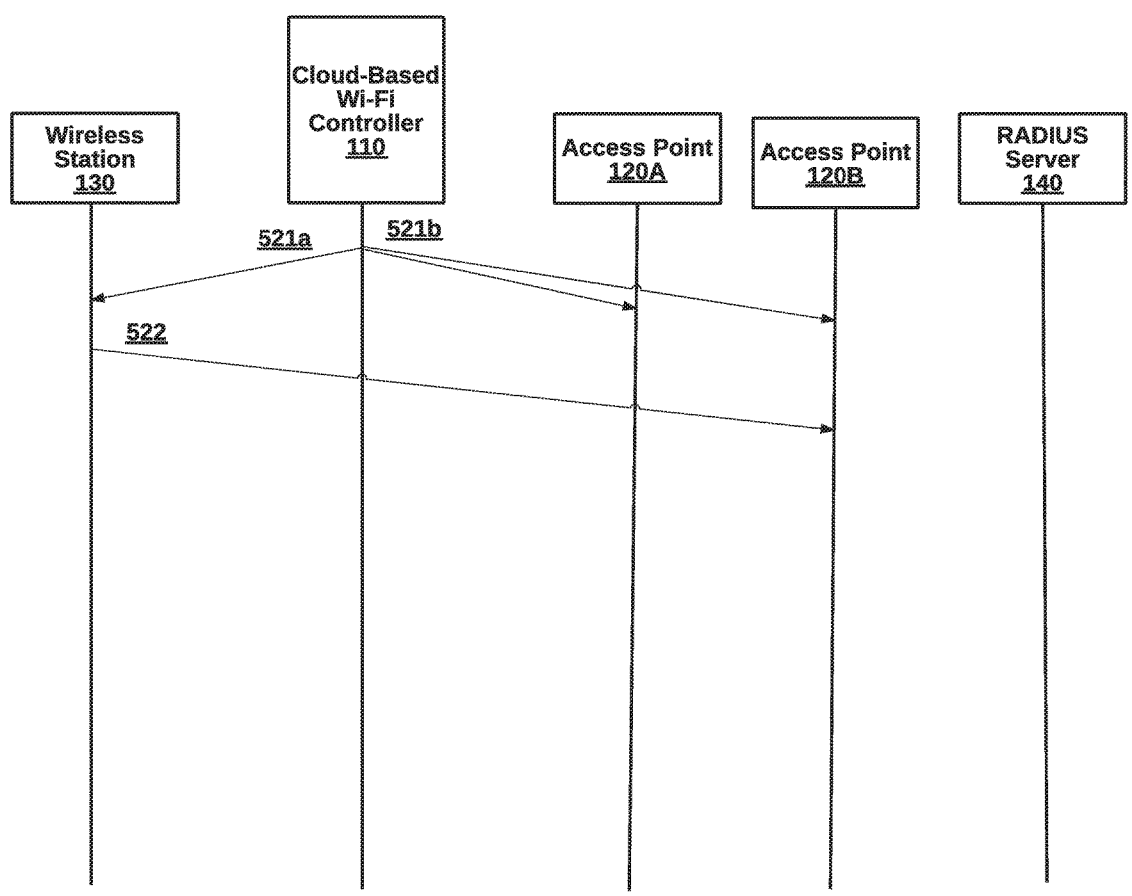

FIGS. 5A-C are sequence diagrams 500A-C illustrating interactions between components of the system in FIGS. 1A-B, according to one embodiment. The specific interactions shown in FIGS. 5A-C and described below can be performed in different orders, can include many sub-interactions, and still be contemplated by the present disclosure. Moreover, the method below of FIG. 6-7 describes processes that can operate be internal to the components, as opposed to the external messages exchanged in FIGS. 5A-C.

Returning to FIG. 5A, the access points 120A and 120B send log in messages to the cloud-based Wi-Fi controller 110 upon power up, reboot, opening of an app, or the like (interactions 501a,b). Similarly, the wireless station 103 sends log-in messages to the cloud-based Wi-Fi controller 110 upon power up, reboot, opening of an app, or the like (interaction 502). There can be several interactions back and forth although only one representative interaction is shown.

Additionally, there can be set-up and registration processes that occur during interactions 501, 502 or beforehand. Next, the wireless station 130 sends messages to the access point 120A for authenticating (e.g., challenge/response messages) and associating for connection (interactions 503-506).

In FIG. 5B, the wireless station 130 broadcasts messages to discover neighboring access points (or other network devices) (interaction 511). In response, the access point 120A and the access point 12B send a response message to the wireless station 130 (interactions 512a and 512b, accordingly). Finally, the wireless station 130 sends a compilation of neighbors, and also IEEE 802.11r fast transition parameters to the cloud-based Wi-Fi controller 110 (interaction 513). In turn, the cloud-based Wi-Fi controller distributes the IEEE 802.11r parameters to access points on the neighbor compilation (interaction 514).

As shown in FIG. 5C, the cloud-based Wi-Fi controller 110 sends messages to both the wireless station 130 and the access point 120A to configure access point service (interactions 504a,b). As a result, network traffic is exchanged between the wireless station 130 and the access point 120A.

At some subsequent point in time, as shown in FIG. 5C, the cloud-based Wi-Fi controller 110 sends messages to update configuration to hand-off the wireless device 130 from the access point 120A to the access point 120B (interaction 507) and both the wireless station 130 and the access point 120A (interactions 508a,b). As a result, network traffic is now exchanged between the wireless station 130 and the access point 120B.

In some embodiments, some messages sent to the RADIUS server 140 have been eliminated due to the secure connection maintained between components through the cloud-based Wi-Fi controller 110. In some embodiments, in which the access point 120A is controlled by a different entity that that of the access point 120B or are otherwise in different domains, additional configuration messages between the wireless station 130 and the access point 120B are eliminated. There can be additional messages implementing the IEEE 802.11r protocol that are not reproduced here.

II. Methods for Fast BSS Transitions (FIGS. 6-7)

Figure 6:
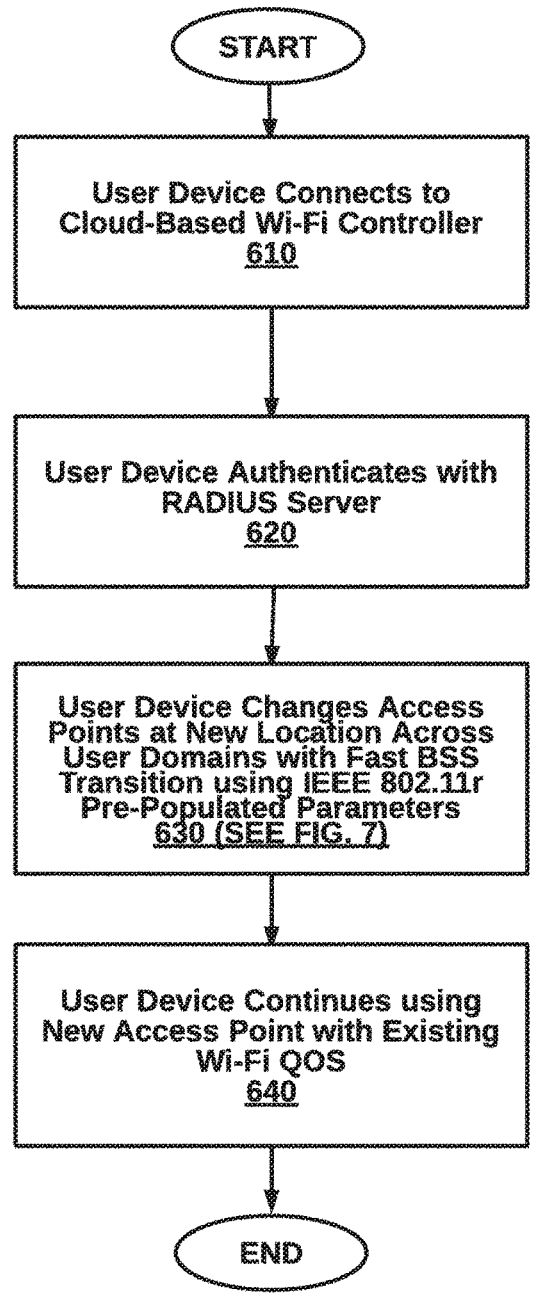
FIG. 6 is a high-level flow diagram illustrating, from the perspective of a cloud-based Wi-Fi controller, a method for fast BSS transitions between access points for stations of cloud-controlled Wi-Fi networks, according to one embodiment.
Figure 7:
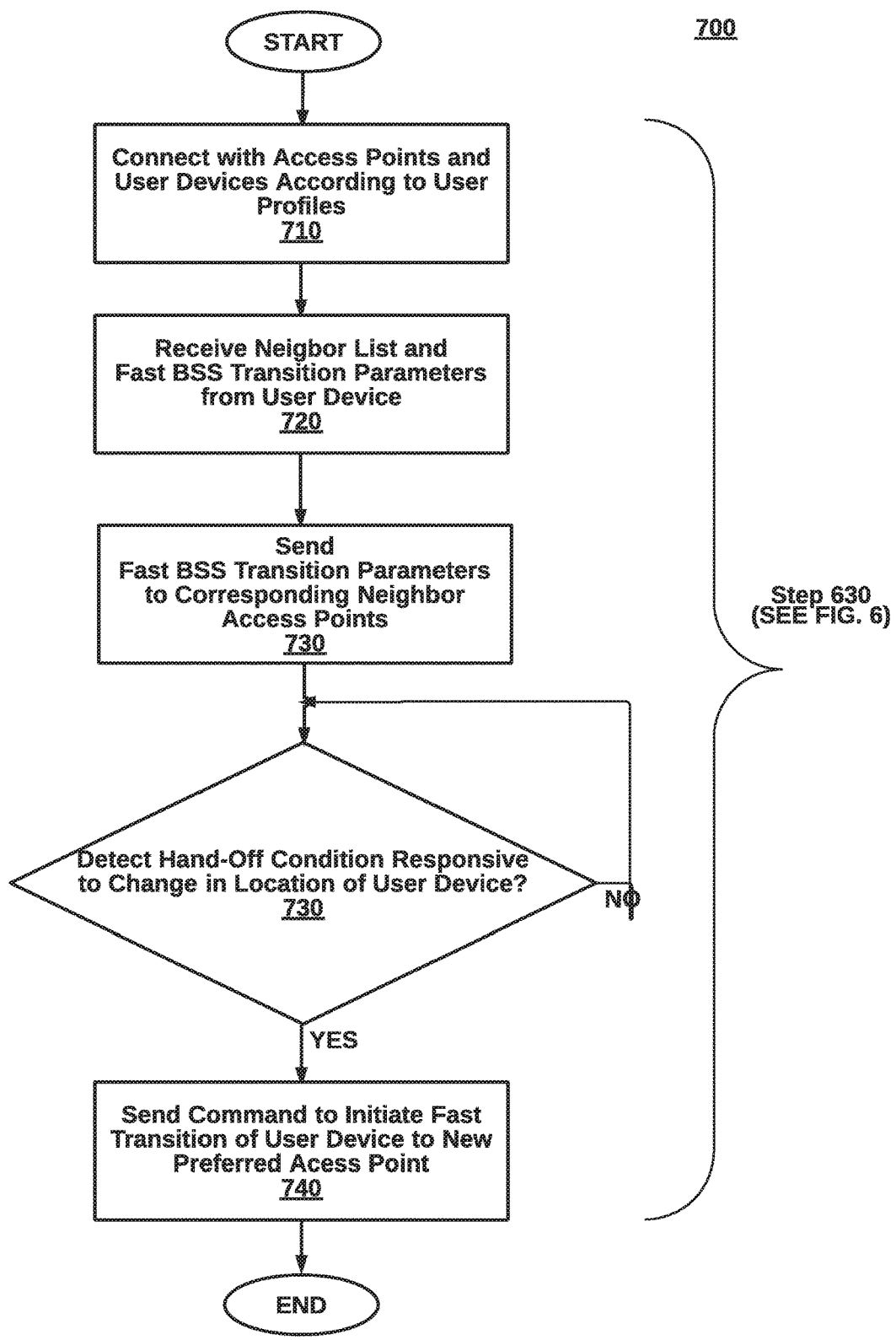
FIG. 7 is a high-level flow diagram illustrating, from the perspective of a network device, a method for fast BSS transitions between access points for stations of cloud-controlled Wi-Fi networks, according to one embodiment.

FIG. 6 is a flow diagram from the perspective of a user device, illustrating a method 600 for fast BSS transitions between access points for stations of cloud-controlled Wi-Fi networks.

At step 610, a user device connects to a cloud-based Wi-Fi controller through Wi-Fi or 4G, for example. A user profile associated with the user device defines which access points are authorized for use.

At step 620, as the user device changes locations, the cloud-based controller uses IEEE 802.11r parameters collected before a hand-off to enable fast BSS transitions between access points. More specifically, a neighbor list of access points under control of the cloud-based Wi-Fi controller are preconfigured with IEEE 802.11r parameters needed for the fast handoff. One example is explained in detail below in association with FIG. 7.

At step 630, the user device continues using a new access point without a noticeable change in network performance. For example, a videocall QOS is supported during a fast BSS transition of access points.

FIG. 6 is a flow diagram from the perspective of a cloud controller device, illustrating a method 600 for fast BSS transitions between access points for stations of cloud-controlled Wi-Fi networks, according to one embodiment.

The method 600 is one example of the operation for the system 100, and can operate in conjunction with the method 500 of FIG. 5.

At step 710, a neighbor list is received at the cloud-based Wi-Fi controller from a network device connected to the data communication system through a first access point. The neighbor list identifies access points within range of the network device.

At step 720, IEEE 802.11r parameters are received from the network device. The network supports IEEE 802.11r for fast BSS transitions.

At step 730, the IEEE 802.11r parameters are transmitted to a second access point from the neighbor list, prior to handing-off the network device. In one embodiment, parameters are sent to each of the access points on the neighbor list.

At step 740, it is determined whether the network device is to be handed-off from the first access point to the second access point.

At step 750, commands are transmitted to the first access point and to the second access point to execute a fast hand-off to re-associate the network device with the second access point for connection to the data communication system.

III. Generic Computing Device (FIG. 8)

FIG. 8 is a block diagram illustrating an exemplary computing device 800 for use in the system 100 of FIG. 1, according to one embodiment. The computing device 800 is an exemplary device that is implementable for each of the components of the system 100, including the cloud based Wi-Fi Onboarding server 110, the network device 120, and the Wireless Station 130. The computing device 800 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 800, of the present embodiment, includes a memory 810, a processor 820, a storage drive 830, and an I/O port 840. Each of the components is coupled for electronic communication via a bus 899. Communication can be digital and/or analog, and use any suitable protocol.

The memory 810 further comprises network applications 812 and an operating system 814. The network applications 812 can include the modules of the components illustrated in FIG. 1. Other network applications 812 can include a web browser, a mobile application, an application that uses networking, a remote application executing locally, a network protocol application, a network management application, a network routing application, or the like.

The operating system 814 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 8 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 820 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like.

Qualcomm Atheros, Broadcom Corporation, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 88 or the storage drive 830.

The storage drive 830 can be any non-volatile type of storage such as a magnetic disc, EEPROM, Flash, or the like. The storage drive 630 stores code and data for applications.

The I/O port 840 further comprises a user interface 842 and a network interface 844. The user interface 842 can output to a display device and receive input from, for example, a keyboard. The network interface 844 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in a cloud-based Wi-Fi control server of a data communication system, implemented at least partially in hardware, the method for fast BSS transitioning between access points for stations of cloud-controlled Wi-Fi networks, the method comprising the steps of:

authenticating a plurality of access points for management of Wi-Fi operations by the cloud-based Wi-Fi control server;

receiving a neighbor list from a specific wireless station of a plurality of wireless stations connected to a plurality of access points, the specific wireless station connected to the data communication system through a first access point of the plurality of access points, the neighbor list identifying access points within range of the specific wireless station;

receiving IEEE 802.11r parameters from the specific wireless station, wherein the network supports IEEE 802.11r for fast BSS transitions;

authenticating on behalf of the wireless station with a RADIUS server coupled to the data communication system using the IEEE 802.11r parameters;

transmitting the IEEE 802.11r parameters to a second access point from the neighbor list, prior to handing-off the specific wireless station;

determining that the specific wireless station is to be handed-off from the first access point to the second access point; and transmitting commands to the first access point and transmitting commands to the second access point to execute a fast hand-off to re-associate the specific wireless station with the second access point for connection to the data communication system, without reauthenticating the wireless station with the RADIUS server.

2. The method of claim 1, wherein the first access point and the second access point are both associated with a commonly owned user profile.

3. The method of claim 1, wherein receiving the IEEE 802.11r parameters comprises receiving the IEEE 802.11 parameters from an application executing on the wireless station, wherein the wireless station application and the Wi-Fi control communicate over a secure communication channel.

4. The method of claim 1, wherein the IEEE 802.11r parameters comprise authentication information necessary for the fast hand-off.

5. The method of claim 1, wherein the wireless station comprises at least one of: a smartphone, a laptop computer, a tablet device, and a wireless, mobile device.

6. A non-transitory computer-readable media storing source code that, when executed, performs a computer-implemented method in a cloud-based Wi-Fi onboarding server of a data communication system, implemented at least partially in hardware, for secure plug-and-play configuration of wireless stations to a Wi-Fi network, the method comprising the steps of:

authenticating a plurality of access points for management of Wi-Fi operations by the cloud-based Wi-Fi control server;

receiving a neighbor list from a specific wireless station of a plurality of wireless stations connected to a plurality of access points, the specific wireless station connected to the data communication system through a first access point of the plurality of access points, the neighbor list identifying access points within range of the specific wireless station;

receiving IEEE 802.11r parameters from the specific wireless station, wherein the network supports IEEE 802.11r for fast BSS transitions;

authenticating on behalf of the wireless station with a RADIUS server coupled to the data communication system using the IEEE 802.11r parameters;

transmitting the IEEE 802.11r parameters to a second access point from the neighbor list, prior to handing-off the specific wireless station;

determining that the specific wireless station is to be handed-off from the first access point to the second access point; and transmitting commands to the first access point and transmitting commands to the second access point to execute a fast hand-off to re-associate the specific wireless station with the second access point for connection to the data communication system, without reauthenticating the wireless station with the RADIUS server.

* * * * *